(12) United States Patent
Tait

(10) Patent No.: US 10,556,526 B2
(45) Date of Patent: Feb. 11, 2020

(54) VENTILATED VEHICLE SEAT WITH PASSIVE VENT PANEL

(71) Applicant: Faurecia Automotive Seating, LLC, Auburn Hills, MI (US)

(72) Inventor: Shaun Dorian Tait, Troy, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 0 days.

(21) Appl. No.: 15/966,527

(22) Filed: Apr. 30, 2018

(65) Prior Publication Data

US 2019/0329681 A1    Oct. 31, 2019

(51) Int. Cl.
*B60N 2/56* (2006.01)
*B60N 2/64* (2006.01)

(52) U.S. Cl.
CPC ............ *B60N 2/5657* (2013.01); *B60N 2/64* (2013.01)

(58) Field of Classification Search
CPC ................................. B60N 2/5657; B60N 2/64
USPC .......................... 297/180.13, 180.14, 452.42
See application file for complete search history.

(56) References Cited

U.S. PATENT DOCUMENTS

| 5,226,188 | A | * | 7/1993 | Liou | ...................... | A47C 7/742 297/452.46 |
| 5,902,014 | A | * | 5/1999 | Dinkel | ................. | B60N 2/5635 297/180.13 X |
| 5,934,748 | A | * | 8/1999 | Faust | ................... | B60N 2/5635 297/180.13 X |
| 6,068,332 | A | * | 5/2000 | Faust | ....................... | A47C 7/74 297/180.13 |
| 6,186,592 | B1 | * | 2/2001 | Orizaris | ............... | B60N 2/5635 297/180.13 X |
| 6,189,966 | B1 | * | 2/2001 | Faust | ................... | B60N 2/5635 297/180.13 |
| 6,196,627 | B1 | * | 3/2001 | Faust | ................... | B60N 2/5635 297/180.14 X |
| 6,206,465 | B1 | * | 3/2001 | Faust | ....................... | A47C 7/74 297/180.14 X |
| 6,224,150 | B1 | * | 5/2001 | Eksin | ................... | B60N 2/5635 297/180.13 X |
| 6,578,910 | B2 | * | 6/2003 | Andersson | ............... | A47C 7/74 297/180.13 X |
| 6,626,488 | B2 | * | 9/2003 | Pfahler | ................... | A47C 7/744 297/180.14 X |
| 6,629,725 | B1 | * | 10/2003 | Kunkel | ............... | B60N 2/5635 297/180.14 X |
| 6,869,140 | B2 | * | 3/2005 | White | ................... | B60N 2/5635 297/180.13 |

(Continued)

FOREIGN PATENT DOCUMENTS

DE    202007002196 U1    5/2007

*Primary Examiner* — Rodney B White
(74) *Attorney, Agent, or Firm* — Reising Ethington P.C.

(57) ABSTRACT

A ventilated vehicle seat includes a vent panel underlying an air permeable trim cover. The vent panel includes a vent that is closed to block air flow when the seat is unoccupied and open to permit air flow when an occupant is on the seat. Opening and closing of the vent is actuated by the weight of the seat occupant. Multiple openings can be spaced along the vent so that forced air flows primarily through vent openings directly alongside the legs or torso of the seat occupant. An effective passive vent panel can be easily made from a sheet of polymeric material with a series of elongated slits cut through the sheet.

20 Claims, 3 Drawing Sheets

(56) References Cited

U.S. PATENT DOCUMENTS

| | | | |
|---|---|---|---|
| 7,108,319 B2 | 9/2006 | Hartwich et al. | |
| 7,229,129 B2* | 6/2007 | White | B60N 2/5635 297/180.13 X |
| 7,506,924 B2* | 3/2009 | Bargheer | B60N 2/5621 297/180.14 |
| 8,408,641 B2* | 4/2013 | Lem | B60N 2/5664 297/180.13 |
| 9,096,158 B2* | 8/2015 | Herbst | B60N 2/5657 |
| 2002/0003362 A1* | 1/2002 | Kunkel | B60N 2/5635 297/180.14 |
| 2002/0096915 A1* | 7/2002 | Haupt | B60H 1/00285 297/180.13 |
| 2002/0096931 A1* | 7/2002 | White | B60N 2/5635 297/452.42 |
| 2003/0230913 A1* | 12/2003 | Buss | B60N 2/5635 297/180.14 |
| 2005/0173950 A1* | 8/2005 | Bajic | A47C 7/72 297/180.14 |
| 2008/0296939 A1* | 12/2008 | Bajic | B60H 1/00285 297/180.1 |
| 2012/0315132 A1* | 12/2012 | Axakov | B60N 2/5635 415/182.1 |
| 2014/0136049 A1* | 5/2014 | Kurtovic | B60K 28/04 701/36 |
| 2016/0318428 A1 | 11/2016 | Hugues | |

* cited by examiner

VENTILATED VEHICLE SEAT WITH PASSIVE VENT PANEL

TECHNICAL FIELD

The present disclosure relates to a vehicle seat and, in particular, to a ventilated vehicle seat.

BACKGROUND

Vehicle seats can be configured to provide a flow of air through the seating surface to enhance environmental comfort of the seat occupant by virtue of the movement of air in the vicinity of the seat occupant's direct physical contact with the seating surface, which is typically hotter or colder than the seat occupant desires, particularly on especially hot or cold days, and particularly when the seat occupant is initially seated. Such systems conventionally distribute the air flow uniformly over a particular area of the seating surface and/or at fixed locations along the seating surface without regard for the size or seating position of the seat occupant.

For example, U.S. Pat. No. 7,229,129 to White et al. discloses a ventilation system that employs a bag beneath the seat trim material. A spacer material is located inside and between top and bottom layers of the bag. The bag is made from an air-impermeable material and has a particular pattern of holes cut through the top layer. Forced air flows into the bag at its rear or bottom end and exits the bag at the holes. The holes are cut larger with increased distance from the rear or bottom to help increased uniformity of air flow through the holes. The holes are arranged in a fixed pattern and each hole has a fixed size.

SUMMARY

In accordance with one or more embodiments, a vehicle seat includes a seat bottom and a seat back. At least one of the seat bottom or the seat back includes an air permeable trim cover and a vent panel underlying the trim cover. The vent panel includes a vent having an opening with a variable size that is greater when the seat is in a loaded condition than when the seat is in an unloaded condition. In the presence of a pressure differential across the vent panel, air flow through the vent is thereby greater in the loaded condition than in the unloaded condition.

In some embodiments, the vent includes first and second vent members on opposite sides of the opening. Each vent member partly defines the opening, and a distance between the first and second vent members is greater in the loaded condition than in the unloaded condition.

In some embodiments, the first vent member is in contact with the second vent member in the unloaded condition thereby blocking air flow through the opening in the unloaded condition.

In some embodiments, the opening is in the form of a slit that is closed in the unloaded condition and open in the loaded condition.

In some embodiments, the opening is one of a plurality of openings. Each opening has a variable size and is defined between a respective pair of vent members. A distance between the vent members of at least one pair of vent members is greater in the loaded condition than in the unloaded condition.

In some embodiments, a distance between the vent members of at least one other pair of vent members is the same in the loaded condition as in the unloaded condition.

In some embodiments, a biasing element is configured to bias the vent toward a closed condition in which air flow through the vent is blocked.

In some embodiments, an air permeable layer underlies the trim cover and overlaps the vent panel. In the presence of a pressure differential across the vent panel and the air permeable layer, air flow through the air permeable layer is thereby greater in the loaded condition than in the unloaded condition.

In some embodiments, the air permeable layer underlies the vent panel and biases the vent toward a closed condition in which air flow through the vent is blocked.

In some embodiments, the opening is one of a plurality of elongated openings spaced apart along the vent panel.

In some embodiments, the vent panel is a monolithic component formed from a sheet of material having a uniform thickness and a uniform material composition with the opening formed through the sheet of material.

In some embodiments, the opening is one of a plurality of openings spaced apart along the vent panel such that the amount of air flow through each of the openings in the loaded condition is dependent on a load distribution along the vent panel.

In some embodiments, a foam cushion underlies the trim cover and an air channel is formed in the foam cushion. The vent panel is interposed between the foam cushion and the trim cover, and the air channel is in fluidic communication with the vent. In the presence of a pressure differential across the air channel and an exterior surface of the trim cover, air flows between the air channel and the exterior surface of the trim cover and through the vent and the trim cover in the loaded condition.

In some embodiments, a blower is in fluidic communication with the air channel to provide the pressure differentials.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Exemplary embodiments will hereinafter be described in conjunction with the appended drawings, wherein like designations denote like elements, and wherein.

DETAILED DESCRIPTION

Described below is a ventilated vehicle seat in which air flow through the seating surface can be passively activated and deactivated depending on whether an occupant is sitting on the seat. The seat ventilation system is also configured so that air flow through the seating surface occurs at locations where it is most effective and self-adjusts to different sized seat occupants or a changing seat occupant position. The system is relatively simple to fabricate and use while providing these and other benefits not available in more complex systems.

Figure 1:
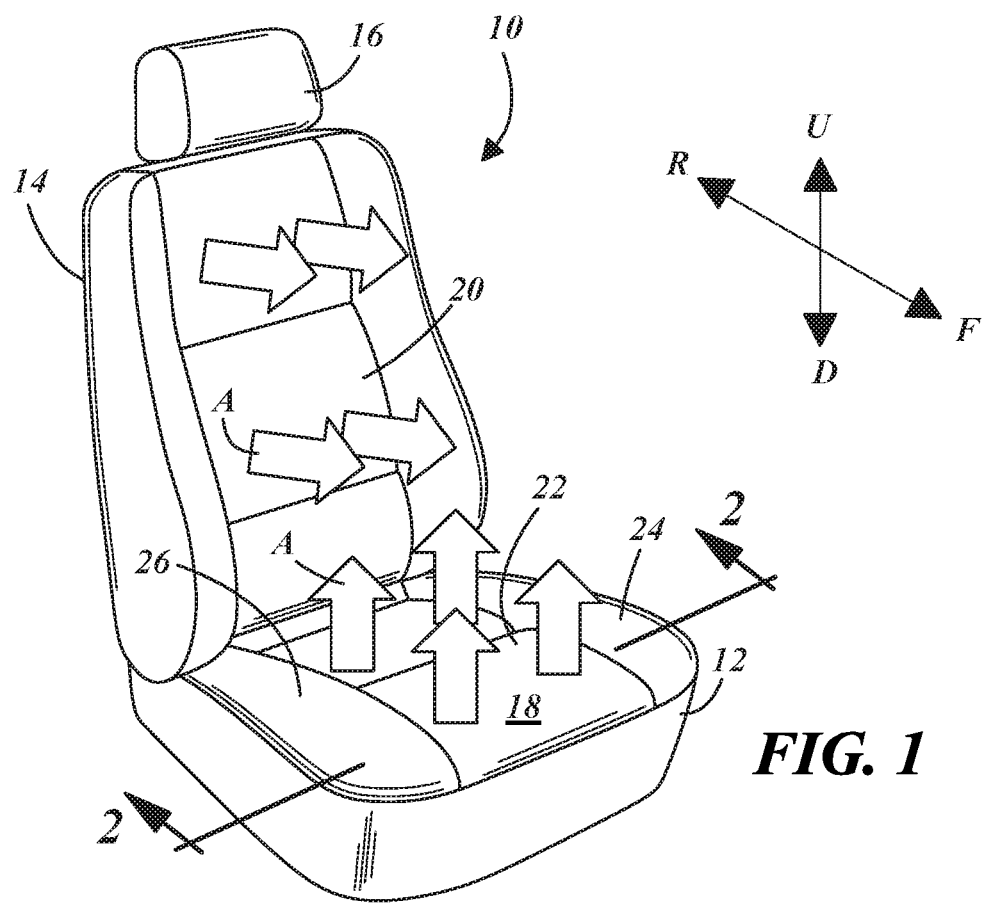
FIG. 1 is a perspective view of an embodiments of a vehicle seat equipped with a seat ventilation system.

FIG. 1 illustrates an exemplary vehicle seat 10 adapted for installation in the passenger cabin of a vehicle via rails along the underside of the seat or other suitable attachment features. The seat 10 includes a seat bottom 12 that supports the majority of the weight of a seat occupant when in use and a seat back 14 extending from the seat bottom. The seat back 14 includes a head rest 16 in this example. Forward (F) and rearward (R) directions are designated in FIG. 1 and may be referred to as longitudinal directions. Upward (U) and downward (D) directions may be referred to as vertical directions, while left and right may be referred to as transverse directions. These directions are with respect to the seat 10 and not necessarily with the vehicle in which the seat is installed. The seat 10 presents a seating surface 18 in the form of an exterior surface of a trim cover 20. Each of the seat bottom 12 and the seat back 14 includes a portion of the seating surface 18, which is in contact with the seat occupant in use. As used herein, the terms "underlying" and "overlying" are in relation to a reference frame in which the seating surface 18 is the topmost surface. For example, an underlying layer in the seat back 14 is generally located rearward of the portion of the seating surface 18 provided by the seat back, and an underlying layer in the seat bottom 12 is generally located beneath the portion of the seating surface provided by the seat bottom.

The seat 10 is a ventilated seat configured to provide an air flow (A) through the seating surface 18 when an underlying seat component is pressurized or depressurized, such as via an internal or external fan or blower. The air flow may include ambient air from the vehicle passenger cabin pulled through the seating surface 18, or it may include air discharged into the passenger cabin through the seating surface as shown in FIG. 1. Discharged air may be heated or cooled by a heat exchanger that is either internal or external to the seat 10. Air flow through the seating surface 18 is enabled in part by at least a portion of the trim cover 20 being air permeable. Perforated leather is one example of an air permeable trim cover 20. Certain woven or knit fabrics are also air permeable. Polymeric materials such as polyvinyl chloride (PVC) or polyurethane can also be used in the trim cover 20 and can be made air permeable via perforations or other suitable means. Different types of materials may also be combined to form the trim cover, so long as it is air permeable at the desired locations. In the illustrated example, the air flow includes air discharged from the seat 10 along a central portion 22 of both the seat bottom 12 and the seat back 14, which is located between bolster portions 24, 26 located along opposite left and right sides of the seat 10. The following description and illustrations are with respect to the seat bottom 12 but are applicable to the seat back 14 as well.

Figure 2:
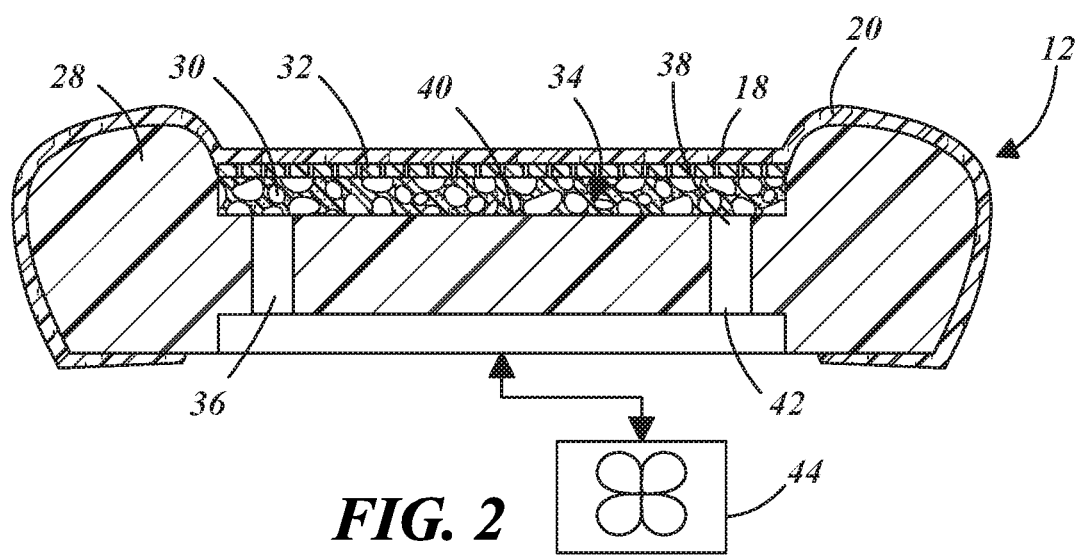
FIG. 2 is a cross-sectional view of a seat bottom illustrating elements of the seat ventilation system, including a passive vent panel.

FIG. 2 is a cross-sectional view of a portion of the seat bottom 12, including a foam cushion 28, an air permeable layer 30, a vent panel 32, and the trim cover 20, all of which provide some portion of a seat ventilation system 34. These components overlie and are supported by a seat pan or frame (not illustrated). The primary function of the foam cushion 28 is to support the seat occupant in a comfortable manner by isolating the occupant from the underlying structural members of the seat and vehicle. The cushion 28 may be a single continuous piece of molded foam or may be constructed from multiple pieces of foam of various densities, for example. The illustrated foam cushion 28 includes air channels 36 extending through its thickness, and each air channel has a first end 38 opening at a top side 40 of the cushion, adjacent the air permeable layer 30. The air channels 36 can take numerous forms and/or proceed through the cushion 28 in various directions, and the cushion may have multiple discrete or interconnected air channels formed therethrough. A second end 42 of the air channel(s) 36 is coupled with a positive or negative pressure source 44 so that the pressure source is in fluidic communication with the air permeable layer 30 and the vent panel 32 via the air channel. In this example, the pressure source 44 is schematically depicted as a blower that can be either a positive or negative pressure source, depending on the orientation of the blower and/or the polarity of the applied power. The blower or other pressure source 44 may be an integral part of the seat or it could be external, such as a blower of the vehicle HVAC system. The pressure source could also be in the form of a pressurized or partly evacuated manifold in the seat, to name a few possibilities.

The air permeable layer 30 functions as a diffuser to help distribute air flow along the desired region of the seat. In this example, the air permeable layer 30 is fitted in a recess along the top of the foam cushion 28 at the central portion 22 of the seat bottom 12 and directly beneath the vent panel 32. While FIG. 2 is not necessarily to scale, the air permeable layer 30 is typically thicker than the air permeable trim cover 20 and is permeable to air in more than only the thickness direction. In particular, the air permeable layer 30 permits air flow not only through its thickness, but also in planar directions i.e., transverse and longitudinal directions in the seat bottom 12. The air permeable layer 30 has elastic properties similar to the foam cushion 28. Reticulated foam and 3D-mesh materials known in the art are suitable materials for the air permeable layer 30, which may itself include multiple layers. In other examples, the air permeable layer can be omitted and air channels can be formed along the top side of the foam cushion to distribute air along the vent panel in planar directions.

The vent panel 32 underlies the trim cover 20 and is located between the trim cover and the air permeable layer 30 in this example. The vent panel 32 includes a vent 46 (see FIG. 3) illustrated in a closed condition in FIG. 2. Air flow through the vent and, thereby, between the seating surface and the air channel 36 is blocked in the closed condition. In some embodiments, the air permeable layer 30 is also a biasing element that biases the vent toward the closed condition by virtue of its elastic properties. In other examples, the air permeable layer 30 overlies the vent panel 32, there are air permeable layers on both sides of the vent panel, the air permeable layer 30 is omitted, or the vent is biased toward the closed position by a different biasing element and/or by elastic properties of the vent panel material. In one particular example, the vent panel includes a thin layer of spring steel or other elastically deformable metal that helps the vent return to the closed condition.

Figure 3:
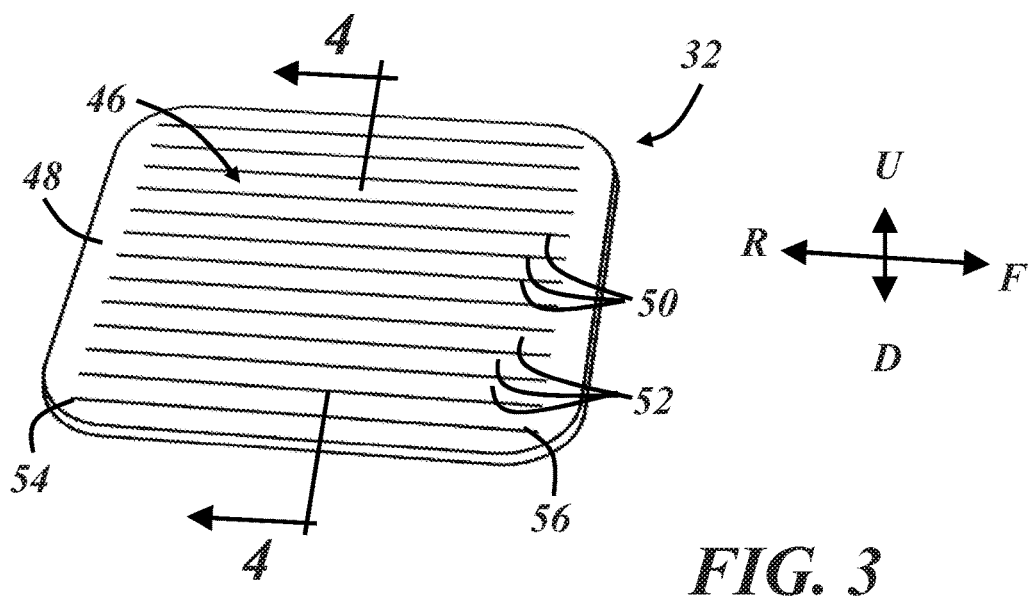
FIG. 3 is a top perspective view of the vent panel of FIG. 2 with the other seat bottom components omitted.

FIG. 3 is a top perspective view of an exemplary vent panel 32. In this example, the vent panel 32 is a monolithic component formed from a sheet of material having a uniform thickness and a uniform material composition. In other examples, the vent panel is constructed from more than one different material and/or has a non-uniform thickness. The illustrated vent panel 32 includes a border or frame 48 at least partly circumscribing the vent 46, and the vent includes a plurality of openings 50 formed through the thickness of the sheet of material. Each opening 50 is located between a pair of adjacent vent members 52. In the particular example of FIG. 3, each opening 50 is an elongated opening in the form of a slit cut through the sheet of material from which the vent panel 32 is made. The slits are parallel with one another, spaced apart along the vent panel 32, and extend along the longitudinal direction between opposite first and second ends 54, 56 within the panel border 48.

The vent members 52 in this example are the elongated solid portions of material between each of the slits 50. The distance between adjacent openings 50 is defined by a width of the vent member 52 between them. In this example, the slits are evenly spaced along the vent panel 32 in the transverse direction, giving the vent members 52 all the same width. In other examples, the spacing among different pairs of adjacent openings varies along the vent panel 32. For example, the openings 50 may be spaced closer together at areas of the vent panel expected to directly underlie the seated occupant than at areas of the vent panel not expected to directly underlie the seated occupant. The slits are closed when the vent 46 is in the illustrated closed condition and are configured to open to selectively permit airflow through the vent, as discussed further below.

The vent panel 32, the vent 46, and/or the vent members 52 may be constructed from a polymeric material and configured such that the maximum anticipated load and strain falls within the elastic region of the material so that the vent panel returns to the desired shape in the unloaded condition after being in the loaded condition. Elastomeric materials such as thermoplastic elastomers (TPE) are one suitable family of materials. Semi-rigid thermoplastics such as thermoplastic olefins (TPO) or thermoplastic polyurethanes (TPU) may also be suitable. Elastomeric materials and materials having an elastomeric component may be preferred due to their tendency to form a sealed opening in the unloaded condition. Other constructions are of course possible, such as vent members made from nearly any material with polymeric or elastomeric edges. A composite material such as a fiberglass or carbon fiber reinforced polymeric material may also be used. In some cases, the frame or border 48 of the vent panel 32 may be omitted in favor of a plurality of slat-like vent members 52 pivotably attached with each other via elastic hinges or pivots that permit adjacent vent members 52 to move relative to each other and the openings 50 to change size when loaded and unloaded.

Figure 4:
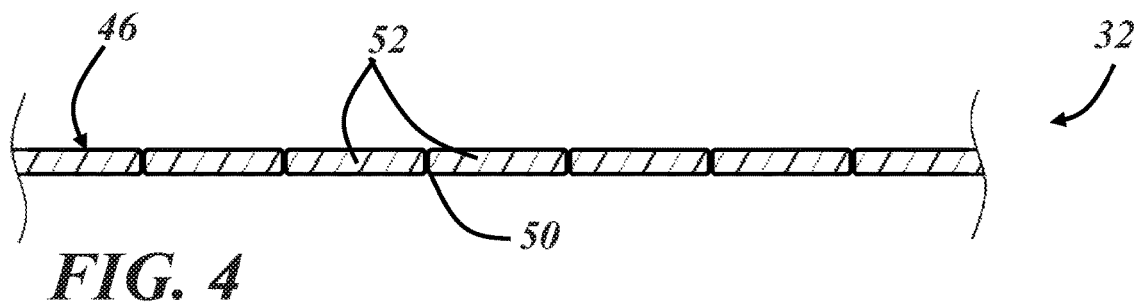
FIG. 4 is a cross-sectional view of a portion of the passive vent panel in an unloaded condition.
Figure 5:
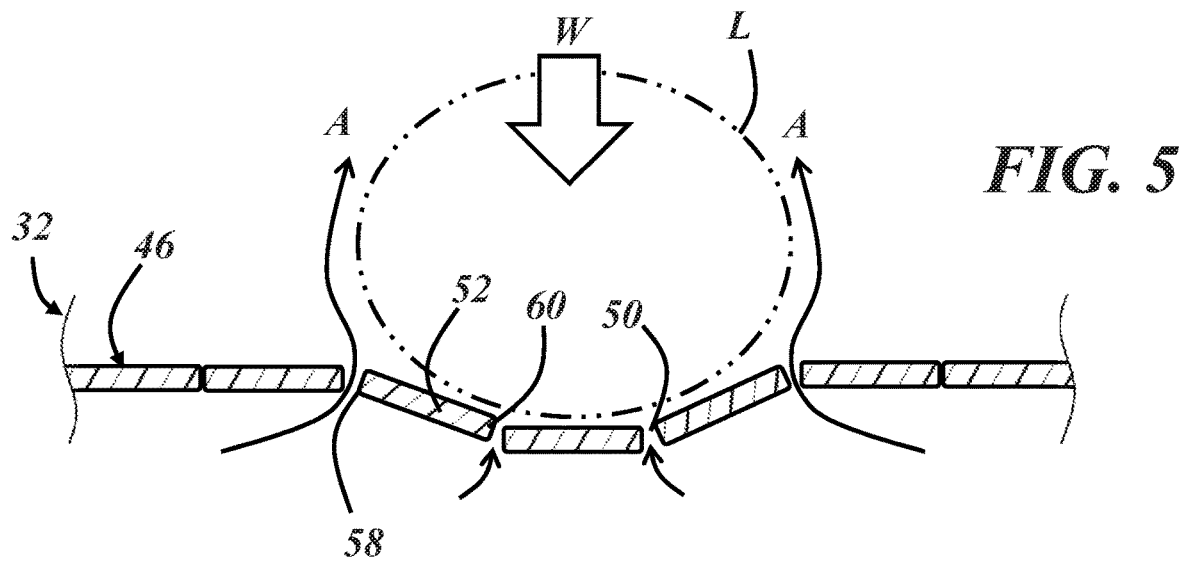
FIG. 5 is a cross-sectional view of the portion of the passive vent panel of FIG. 4 in a loaded condition with a seat occupant leg shown in phantom.

FIGS. 4 and 5 are cross-sectional views of a portion of the vent panel 32 of FIG. 3 with the seat in respective unloaded and loaded conditions, corresponding to an unoccupied seat and an occupied seat. A leg (L) of the seat occupant is depicted in phantom in FIG. 5 and induces the loaded condition via a portion of the weight (W) of the seat occupant. Each opening 50 has a variable size that is greater when the seat is in the loaded condition than when the seat is in the unloaded condition. In the illustrated example, the slits 50 are closed and have a negligible size in the unloaded condition of FIG. 4, and the slits are open and assume a greater size in the loaded condition of FIG. 5. In this context, the size of each opening 50 may be defined as the area or effective area of the opening. For example, the size of a rectangular opening may be defined as the product of its length and width. The size of the openings 50 is a variable that affects the amount of air flow (A) through the vent 46. As such, variable-sized openings can result in variable amount of air flow through the vent 46, with the air flow through the vent being greater in the loaded condition than in the unloaded condition in the presence of a pressure differential across the vent panel—e.g., when the seating surface 18 (FIG. 2) is at atmospheric pressure and the air channel 36 (FIG. 2) is above or below atmospheric pressure. The air flow may be quantified as volumetric air flow or mass air flow.

In the illustrated configuration, the openings 50 and the vent members 52 are in an alternating arrangement in the transverse direction with one vent member on one side of each opening and another different vent member on a transversely opposite side of the same opening. Each vent member 52 partly defines one of the openings 50. In the illustrated example, most of the vent members 52 define a portion of two of the openings 50 with one transverse edge 58 defining a portion of one of the openings and an opposite transverse edge 60 defining a portion of an adjacent opening. As shown in FIG. 4, adjacent vent members 52 may be in contact with each other in the unloaded condition, thereby blocking air flow through the interposed opening 50. Each of the vent members 52 may also be moveable relative to each other such that a distance between adjacent vent members is greater in the loaded condition than in the unloaded condition, thereby causing the interposed opening 50 to be larger in the loaded condition than in the unloaded condition. Adjacent vent members 52 are not necessarily always in contact with each other along the entirety of their opposing edges to form a perfect seal with zero air flow permitted through the opening in the unloaded condition. In some cases, a small amount of air flow may be permitted even in the unloaded condition with increased air flow in the loaded condition.

Air flow through the vent 46 may also be a function of load distribution along the seating surface and, thereby, along the vent panel 32. For example, the amount of air flow may be different through each individual opening 50 of the vent 46 depending on the magnitude of the load, the transverse and longitudinal distribution of the load, the size (e.g., the width) of the load distribution, and/or the location of a center of the load distribution. This has the beneficial effect of enlarging the openings 50 of the vent 46 that are most effective for the air flow to provide comfort to the seated passenger, as illustrated in FIG. 5. The openings 50 that increase most in size from the unloaded to the loaded condition are those that are closest to the applied load. With the load being provided by the weight of the seat occupant, this means that the openings 50 of the vent 46 underlying and directly alongside the seat occupant's relevant body part (e.g., leg, hips, torso, etc.) exhibit the greatest increase in size. The increased-size openings 50 directly underlying the seat occupant are blocked by the seat occupant, forcing the airflow to be greatest directly alongside the seat occupant's body. Indeed, as shown in the example of FIG. 5, some of the openings 50 of the vent 46 may not increase in size at all in the loaded condition.

Figure 6:
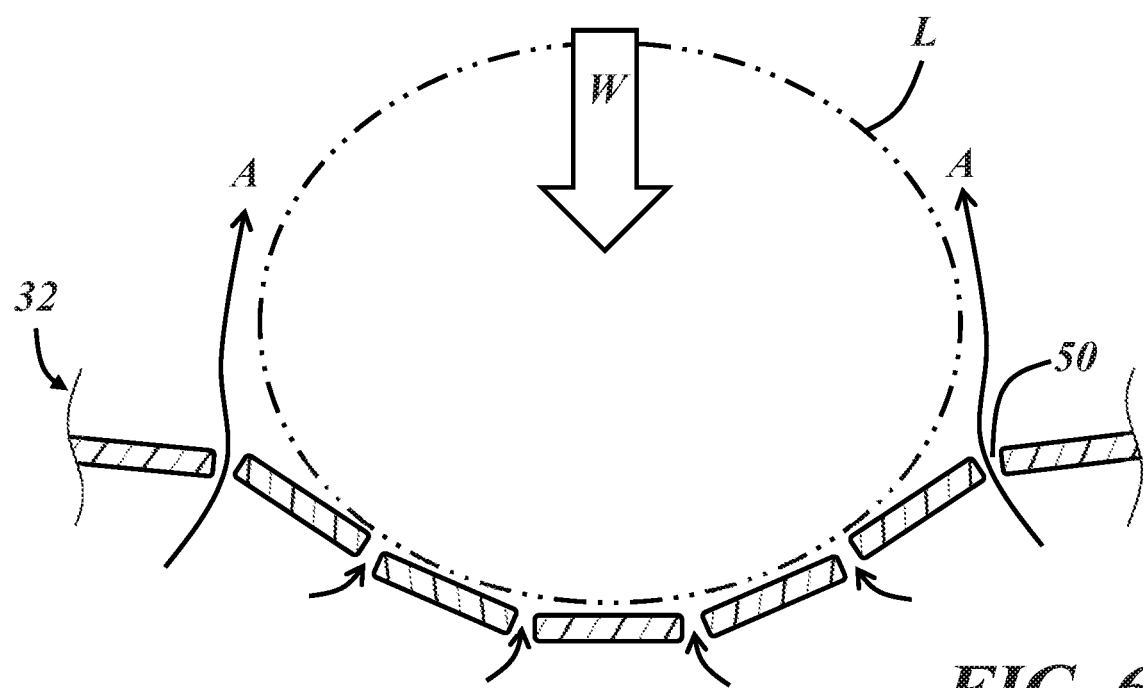
FIG. 6 is a cross-sectional view of the portion of the passive vent panel of FIG. 5 in the loaded condition with a larger seat occupant leg shown in phantom.
Figure 7:
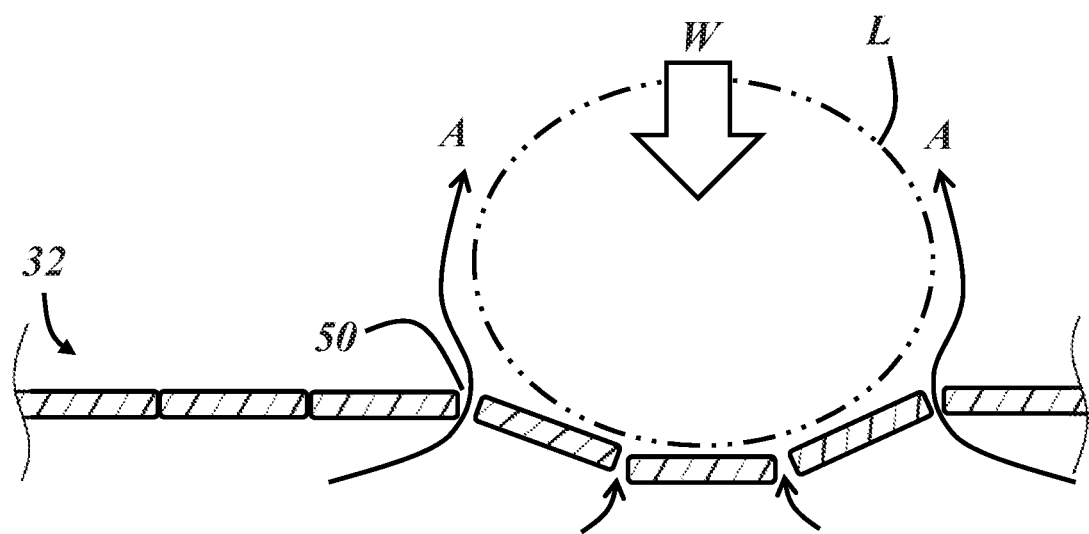
FIG. 7 is a cross-sectional view of the portion of the passive vent panel of FIG. 5 in the loaded condition with the seat occupant leg transversely shifted.

FIGS. 6 and 7 respectively illustrate the loaded condition of the same portion of the vent panel 32 of FIGS. 4 and 5 with a larger seat occupant leg and with the seat occupant leg in a different position. As shown in FIG. 6, the particular openings 50 providing the greatest amount of air flow are spaced further apart than in FIG. 5 so that the air flow is directed along the seat occupant's leg. If the larger-legged seat occupant vacates the seat and a smaller-legged seat occupant sits in the seat, the configuration of FIG. 5 is reached again. As shown in FIG. 7, the particular openings 50 providing the greatest amount of air flow are transversely shifted from those in FIG. 5 so that the air flow remains primarily directed along the seat occupant's leg even after the shifted position. If the seat occupant shifts back to the position of FIG. 5, the configuration of FIG. 5 is reached again.

The vent panel 32 and the seat in which it is installed is thus imparted with a ventilation system that permits and/or increases air flow through the seating surface only when necessary and that exhibits a variable air flow profile along the seating surface that corresponds to the ideal air flow locations. Further, the system is a passive one in that it does not require sensors, switches, or user-controllable actuators to provide these features, nor does it require any measurements or correlations to seat occupant size or position in the seat to know where to provide the most air flow along the seating surface.

The passive vent panel 32 illustrated in the figures and discussed in detail above is only exemplary and can be constructed in various ways to achieve the same or similar advantages. For instance, the openings 50 may be configured as something other than slits and/or may be shaped or oriented differently than those discussed above—e.g., the openings 50 may be non-parallel, elongated transversely or in more than one direction, curved or otherwise non-rectilinear. The passive operation of the vent panel 32 and the associated ventilation system can also be supplemented with active elements, and the system may include other components not specifically illustrated or discussed above, such as heating elements, thermoelectric devices, graphite conductors, etc. The vent panel 32 may be part of a bench-style seat and is not limited to the portions of the seat in the figures. The seat may include more than one vent panel, even within the same layer of the seat, or the vent panel may be made as an integral piece of the above-described foam cushion—e.g. a foam cushion with similarly formed slits that open in the loaded condition and close in the unloaded condition and that extend between a pressurized air cavity underlying the foam cushion and the air permeable layer or trim cover.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle seat comprising a seat bottom and a seat back, at least one of the seat bottom or the seat back comprising: an air permeable trim cover; and
a vent panel underlying the trim cover and comprising a vent having an opening with a variable size that is greater when the seat is in a loaded condition than when the seat is in an unloaded condition,
whereby, in the presence of a pressure differential across the vent panel, air flow through the vent is greater in the loaded condition than in the unloaded condition,
wherein the vent comprises first and second vent members on opposite sides of the opening, each vent member partly defining the opening, and a distance between the first and second vent members being greater in the loaded condition than in the unloaded condition.

2. A vehicle seat as defined in claim 1, wherein the first vent member is in contact with the second vent member in the unloaded condition thereby blocking air flow through the opening in the unloaded condition.

3. A vehicle seat as defined in claim 1, wherein the opening is in the form of a slit that is closed in the unloaded condition and open in the loaded condition.

4. A vehicle seat as defined in claim 1, wherein the opening is one of a plurality of openings each having a variable size and being defined between a respective pair of vent members.

5. A vehicle seat as defined in claim 4, wherein a distance between the vent members of at least one pair of vent members is the same in the loaded condition as in the unloaded condition.

6. A vehicle seat as defined in claim 1, further comprising a biasing element configured to bias the vent toward a closed condition in which air flow through the vent is blocked.

7. A vehicle seat as defined in claim 1, further comprising an air permeable layer underlying the trim cover and overlapping the vent panel, whereby, in the presence of a pressure differential across the vent panel and the air permeable layer, air flow through the air permeable layer is greater in the loaded condition than in the unloaded condition.

8. A vehicle seat as defined in claim 7, wherein the air permeable layer underlies the vent panel and biases the vent toward a closed condition in which air flow through the vent is blocked.

9. A vehicle seat as defined in claim 1, wherein the opening is one of a plurality of elongated openings spaced apart along the vent panel.

10. A vehicle seat as defined in claim 1, wherein the vent panel is a monolithic component formed from a sheet of material having a uniform thickness and a uniform material composition with the opening formed through the sheet of material.

11. A vehicle seat as defined in claim 1, wherein the opening is one of a plurality of openings spaced apart along the vent panel such that the amount of air flow through each of the openings in the loaded condition is dependent on a load distribution along the vent panel.

12. A vehicle seat as defined in claim 1, further comprising a foam cushion underlying the trim cover and an air channel formed in the foam cushion, wherein the vent panel is interposed between the foam cushion and the trim cover, and
wherein the air channel is in fluidic communication with the vent,
whereby, in the presence of a pressure differential across the air channel and an exterior surface of the trim cover, air flows between the air channel and the exterior surface of the trim cover and through the vent and the trim cover in the loaded condition.

13. A vehicle seat as defined in claim 12, further comprising a blower in fluidic communication with the air channel to provide the pressure differentials.

14. A vehicle seat comprising a seat bottom and a seat back, at least one of the seat bottom or the seat back comprising:
   an air permeable trim cover; and
   a vent panel underlying the trim cover and comprising a vent having an opening with a variable size that is greater when the seat is in a loaded condition than when the seat is in an unloaded condition,
   whereby, in the presence of a pressure differential across the vent panel, air flow through the vent is greater in the loaded condition than in the unloaded condition,
   the vehicle seat further comprising a foam cushion underlying the trim cover and an air channel formed in the foam cushion,
   wherein the vent panel is interposed between the foam cushion and the trim cover, and
   wherein the air channel is in fluidic communication with the vent,
   whereby, in the presence of a pressure differential across the air channel and an exterior surface of the trim cover, air flows between the air channel and the exterior surface of the trim cover and through the vent and the trim cover in the loaded condition.

15. A vehicle seat as defined in claim 14, wherein air flow through the opening is blocked in the unloaded condition.

16. A vehicle seat as defined in claim 14, further comprising a biasing element configured to bias the vent toward a closed condition.

17. A vehicle seat as defined in claim 14, wherein the amount of air flow through the vent panel in the loaded condition is dependent on a load distribution along the vent panel.

18. A vehicle seat comprising a seat bottom and a seat back, at least one of the seat bottom or the seat back comprising:
   an air permeable trim cover; and
   a vent panel underlying the trim cover and comprising a vent having an opening with a variable size that is greater when the seat is in a loaded condition than when the seat is in an unloaded condition,
   whereby, in the presence of a pressure differential across the vent panel, air flow through the vent is greater in the loaded condition than in the unloaded condition,
   the vehicle seat further comprising a biasing element configured to bias the vent toward a closed condition in which air flow through the vent is blocked.

19. A vehicle seat as defined in claim 18, wherein air flow through the opening is blocked in the unloaded condition.

20. A vehicle seat as defined in claim 18, wherein the biasing element comprises an air permeable layer underlying the trim cover and overlapping the vent panel.

* * * * *